(12) United States Patent
Summerlin

(10) Patent No.: US 7,059,956 B1
(45) Date of Patent: Jun. 13, 2006

(54) PORTABLE GAME HOIST

(76) Inventor: Harold Summerlin, 134 Delena Dr., Longview, WA (US) 98632

( * ) Notice: Subject to any disclaimer, the term of this patent is extended or adjusted under 35 U.S.C. 154(b) by 0 days.

(21) Appl. No.: 10/771,731

(22) Filed: Feb. 4, 2004

(51) Int. Cl.
*A22B 1/00* (2006.01)
(52) U.S. Cl. ..................................... 452/192
(58) Field of Classification Search .......... 294/67.1, 294/67.2, 67.3, 67.4, 67.41; 452/54, 185–189, 452/198; 254/199, 227, 389, 217, 218, 334–336, 254/325, 326; 182/133–136; 212/180, 175, 212/176, 294
See application file for complete search history.

(56) References Cited

U.S. PATENT DOCUMENTS

| 351,592 | A | * | 10/1886 | Gillman ...................... 254/336 |
| 1,214,104 | A | * | 1/1917 | Wingire ...................... 254/334 |
| 3,300,186 | A | * | 1/1967 | Lee ............................. 254/334 |
| 4,438,905 | A | * | 3/1984 | Nishimura .................. 254/389 |
| 4,860,404 | A | * | 8/1989 | Flachs ........................ 452/187 |
| 5,211,601 | A | * | 5/1993 | Cope ........................... 452/187 |
| 5,284,324 | A | * | 2/1994 | Bunger ....................... 254/266 |
| 5,562,534 | A | | 10/1996 | McGough |
| 5,588,907 | A | | 12/1996 | DePietro et al. |
| 6,059,266 | A | * | 5/2000 | Ascherin et al. ............ 254/334 |
| 6,202,868 | B1 | | 3/2001 | Murray |
| 6,554,254 | B1 | * | 4/2003 | Vetesnik ..................... 254/325 |
| 6,578,722 | B1 | | 6/2003 | Perkins et al. |

\* cited by examiner

*Primary Examiner*—Thomas Price
(74) *Attorney, Agent, or Firm*—Brian J. Coyne

(57) ABSTRACT

A device, easily assembled and disassembled for portability, for hoisting and skinning large game in the wilderness. A pair of upright members extend upward from base members, and a cross beam joins upper ends of the upright members to form a rigid frame. A winch mounted on an upright member includes a barrel sufficiently wide to accommodate two cables in side-by side relation and a handle for rotating the barrel. A first cable extends from the barrel of the winch through a dual-sheaved pulley suspended from the cross beam proximal to the winch and thence through a second pulley suspended from the cross beam distal to the winch. A second cable extends from the barrel of the winch through the dual-sheaved pulley. With the hind legs of a carcass attached to the cables, rotating the handle hoists the carcass and tensions apart the hind legs to facilitate skinning. In an alternative embodiment, the frame comprises three upright members pivotally attached to a cross beam and capable of being positioned on a ground surface in tripod configuration. In both embodiments, provision is made for varying the length of at least one upright member to adjust the hoist to sloping or uneven ground.

11 Claims, 9 Drawing Sheets

PORTABLE GAME HOIST

CROSS REFERENCE TO RELATED APPLICATIONS

None.

STATEMENT REGARDING FEDERALLY APPROVED RESEARCH OR DEVELOPMENT

Not applicable.

BACKGROUND OF THE INVENTION

1. Field of the Invention

This invention relates generally to devices for hoisting and skinning game animals, and in particular to such game hoists that are portable by virtue of their light weight, compactness and ease of assembly and disassembly.

2. Background Art

Portable game hoists have been disclosed for hoisting a game animal onto a motor vehicle; see, for example, U.S. Pat. No. 6,578,722 B2 to Perkins et al. But, a hunter who kills a large game animal such as a deer, moose or bear, in an area inaccessible to motor vehicles needs to be able to hoist and skin the animal on site and then cut the animal into pieces small enough to carry to motorized transport, such as a pickup truck or sports utility vehicle. Portable game hoists have also been disclosed that attach to a horizontal or vertical support that may be found near the site of a kill, of which U.S. Pat. No. 5,588,907 to DiPietro et al., U.S. Pat. No. 6,202,868 B1 to Murray, and U.S. Pat. No. 5,562,534 to McGough are examples, but their utility is limited to locations that happen to provide such supports.

U.S. Pat. No. 6,296,559 B1 to Kinnebrew disclosed a transportable winch operated apparatus for removing the skin of an animal carcass in the wild. Kinnebrew's apparatus had a substantially rectangular platform to which a pair of sectional tubular stanchions were detachably secured. A cross member mounted to the stanchions carried a winch and retractable cable connected to an elongated carcass-lifting member. The carcass-lifting member had a pair of adjustable and flexible carcass leg retaining members that attached to the carcass's hind legs. Although Kinnebrew's apparatus overcame the limitations of the above-referenced disclosures, no provision was made by Kinnebrew to tension apart the hind legs of a carcass hoisted by his apparatus. Separating the rear legs from one another under tension facilitates skinning a hoisted, four-legged carcass. A need remains, therefore, for a hunter's skinning hoist that is portable, requires no on-site horizontal or vertical support, and tensions apart the hind legs of a hoisted carcass to facilitate skinning the carcass.

SUMMARY OF THE INVENTION

Accordingly, it is an object of the invention to provide a hunter's skinning hoist that will hoist a game carcass to a height above ground suitable and convenient for skinning the carcass.

Another object of the invention is to provide such a hoist that can be easily carried to and assembled at the site of a game kill by a hunter and thereafter disassembled for compact transport and storage.

A further object of the invention is to provide such a hoist that, in assembled configuration, is free standing and requires no pre-existing supports in the vicinity of a game kill.

A still further object of the invention is to provide such a hoist that tensions apart the hind legs of a hoisted, four-legged game carcass to facilitate skinning the carcass.

These and other objects are achieved by providing a hoist that, in an assembled first embodiment, has a rigid frame comprising two spaced-apart bases, upright members that extend upward from the bases, and a cross beam adapted to bridge the upper ends of the upright members. The bases are elongated for stable placement of the hoist on the ground. A winch mounted to an upright member is equipped with a barrel sufficiently wide to accommodate two cables in side-by-side relation and a handle for rotating said barrel. Attached to and depending from the cross beam proximal to the winch is a first pulley block that includes a first, dual-sheaved pulley. A second pulley bloc, which includes a second, single-sheaved pulley, is attached to and depends from the cross beam distal to the winch. A first cable has a first end portion wound around the barrel of the winch, an intermediate portion that extends through the first pulley wherein it engages a first sheave therein and thence extends through the second pulley, and a second, opposite end portion that depends from the second pulley. A second cable has a first end portion wound around the barrel of the winch adjacent the first cable, an intermediate portion that extends through the first pulley wherein it engages the second sheave therein and thence terminates in an opposite, second end portion that depends from the first pulley. Thus, when the hind legs of a four-legged game carcass are attached to the second ends of the cables and the handle of the winch is rotated, the carcass is lifted above ground and the hind legs are tensioned apart. The fore legs of the carcass can then be drawn apart and oppositely secured to lower portions of the upright members by suitable tension means, and the carcass is ready for skinning. Preferably, at least one of the upright members includes a first, lower portion, and a second, upper portion in telescoping relation to the lower portion, such that the length of said member can be adjusted to accommodate the frame to uneven terrain.

In a second, alternative embodiment, the assembled hoist comprises first and second, spaced-apart bases, and a third base disposed intermediate the first and second bases. First, second and third upright members are attached to and extend upward from the first, second and third bases, respectively. A cross beam is adapted to bridge the upper ends of the upright members. The upper ends of the upright members are pivotally mounted for rotation about the cross beam thereby forming a frame in the following manner: when the first and second upright members and their attached bases are partially rotated outward in a first direction and the third upright member and attached base is partially rotated outward in a second, opposite direction, and the bases are placed on the ground, the frame assumes a stable, tripod frame configuration. A winch is mounted on an upright member and equipped with a barrel sufficiently wide to accommodate two cables in side-by-side relation and a handle for rotating the barrel. Attached to and depending from the cross beam proximal to an upper end of the first upright member is a first pulley block that includes a first pulley. A second pulley block is attached to and depends from the cross beam proximal to an upper end of the second upright member and includes a second pulley. A first cable has a first end portion wound around the barrel of the winch and an intermediate portion that extends through the first pulley and terminates in an opposite, second end portion. A second cable has a first end portion wound around the barrel of the winch, an intermediate portion that extends through the second pulley and terminates in an opposite, second end portion. With the second end portions of the cables attached to the hind legs of a game carcass, rotation of the handle of the winch causes the carcass to rise off the ground and tensions the hind legs apart. With the fore legs of the carcass drawn apart and oppositely secured by tension means to the upright members, the carcass is ready for skinning. Preferably the lengths of the first and second upright members are independently adjustable for placing the hoist on uneven ground, and the upper ends of the upright members include hollow, cylindrical openings for mating engagement with, and rotation about, cylindrical bearing surfaces of the cross beam.

DETAILED DESCRIPTION OF THE PREFERRED EMBODIMENT

Figure 1:
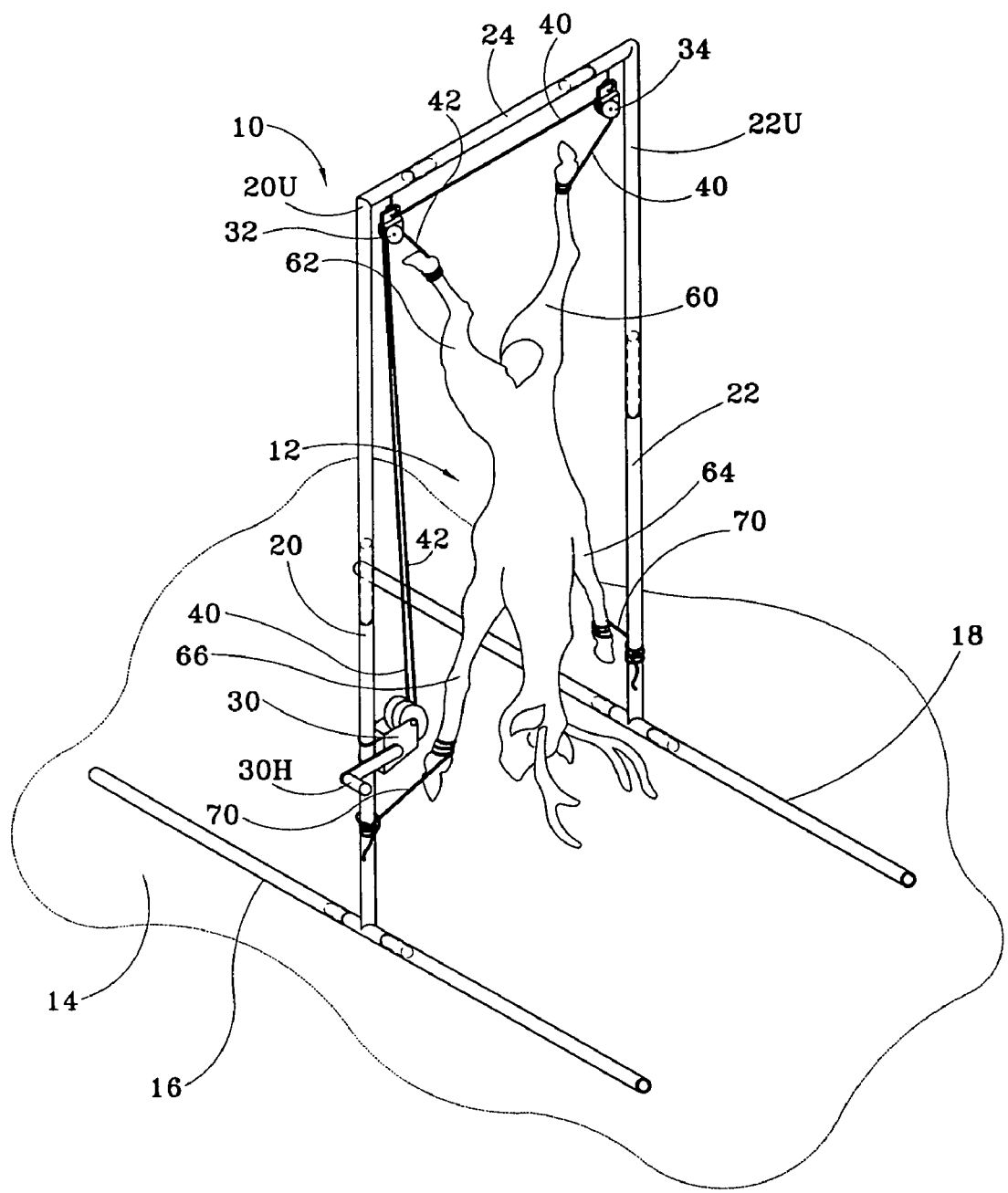
FIG. 1 is a frontal view of an assembled, first embodiment of the invention in perspective.
Figure 9:
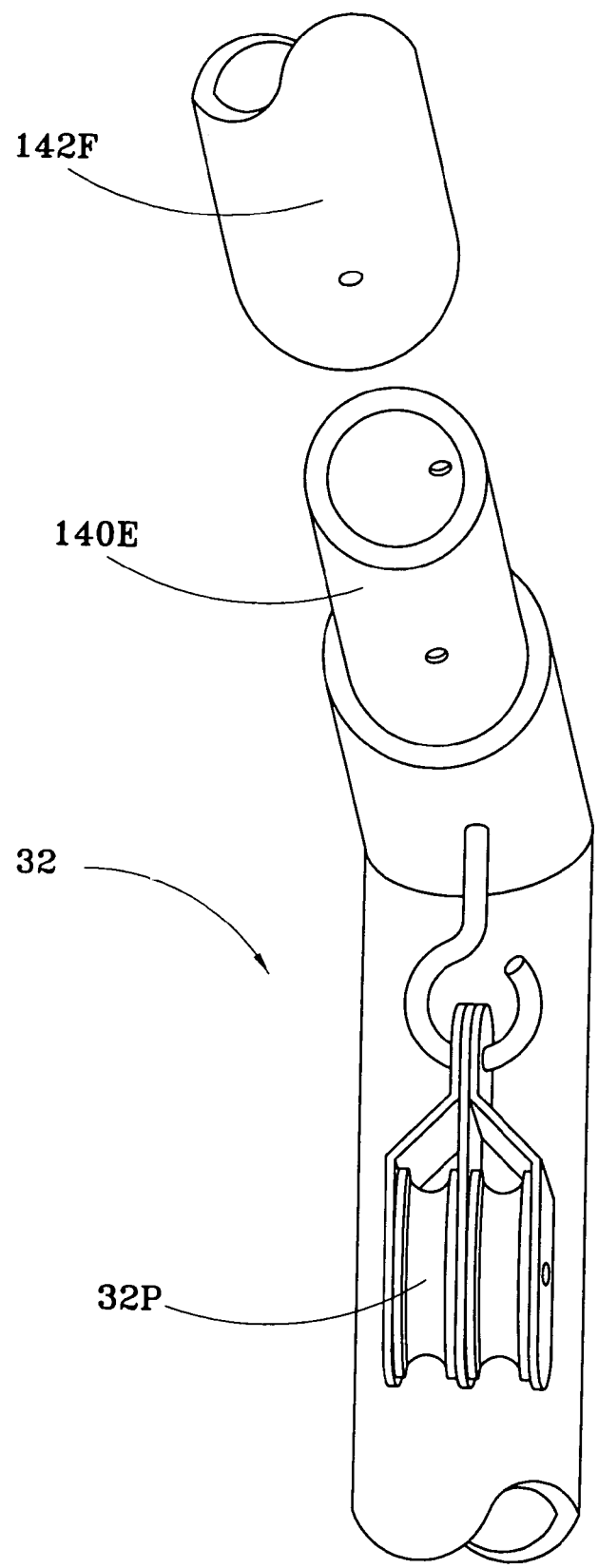
FIG. 9 is an enlarged, elevational view of the first pulley block with the cables removed for clarity.

Referring to FIG. 1, a first embodiment of the invention, denoted generally by the numeral 10, is depicted supporting a hoisted deer carcass 12, over a substantially flat and level ground surface 14. A rigid frame is provided comprising a pair of spaced-apart, longitudinally-elongated bases 16, 18 upright members 20, 22 that extend upward from the bases 16, 18, respectively, and a laterally disposed cross beam 24 that bridges the upper ends 20U, 22U of the upright members 20, 22. A winch 30, equipped with a barrel 30B and a handle 30H for rotating the barrel, is mounted on one of the upright members 20. A first pulley block 32 is attached to and depends from the cross beam 24 at a point proximal to the winch 30. The first pulley block 32 includes a dual-sheaved pulley 32P as shown in FIG. 9. A second pulley block 34 is attached to and depends from the cross beam 24 at a point distal from the winch 30 and proximal to an upper end 22U of upright member 22. The second pulley block 34 includes a second, single-sheaved pulley. A first cable 40 has a first end (not shown) wound around the barrel of the winch 30, an intermediate portion that extends through the first sheave within the first pulley, extends laterally underneath the cross beam 24, through the second pulley, and thence downward for attachment to a first hind leg 60 of a game carcass such as the deer 12 depicted in FIG. 1. A second cable 42 has a first end (not shown) wound around the barrel of the winch 30, an intermediate portion that extends through the second sheave within the first pulley of pulley block 32, and thence extends downward for attachment to a second, opposite hind leg 62 of a game carcass 12. Tension means 70 are provided for oppositely securing the spread-apart, fore limbs 64, 66 of the carcass 12 to lower portions of the adjacent upright members 22, 20 respectively. Suitable tension means 70 include Bungee cords or ropes.

Figure 2:
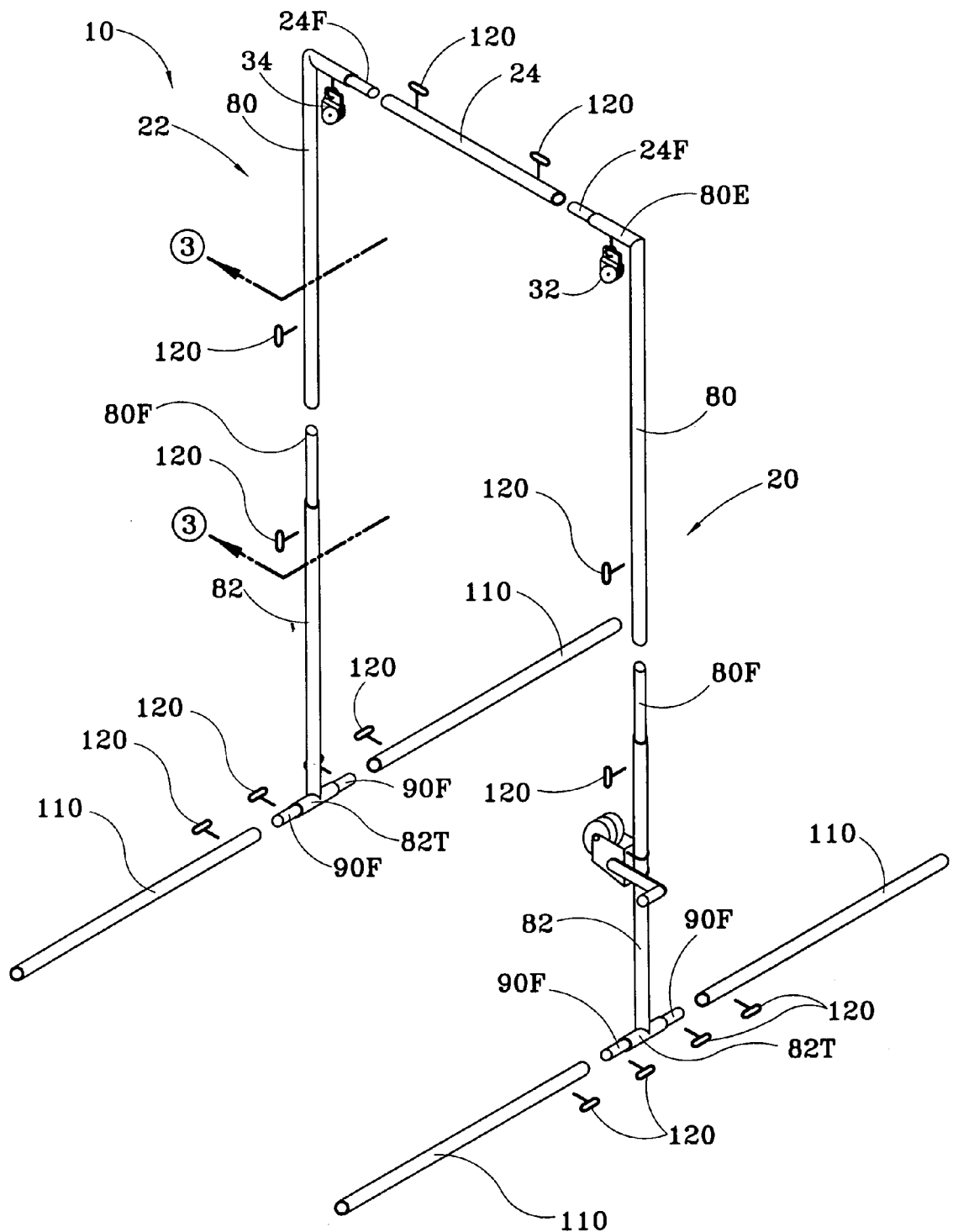
FIG. 2 is a rear, exploded view thereof in perspective with the cables removed for clarity.
Figure 3:
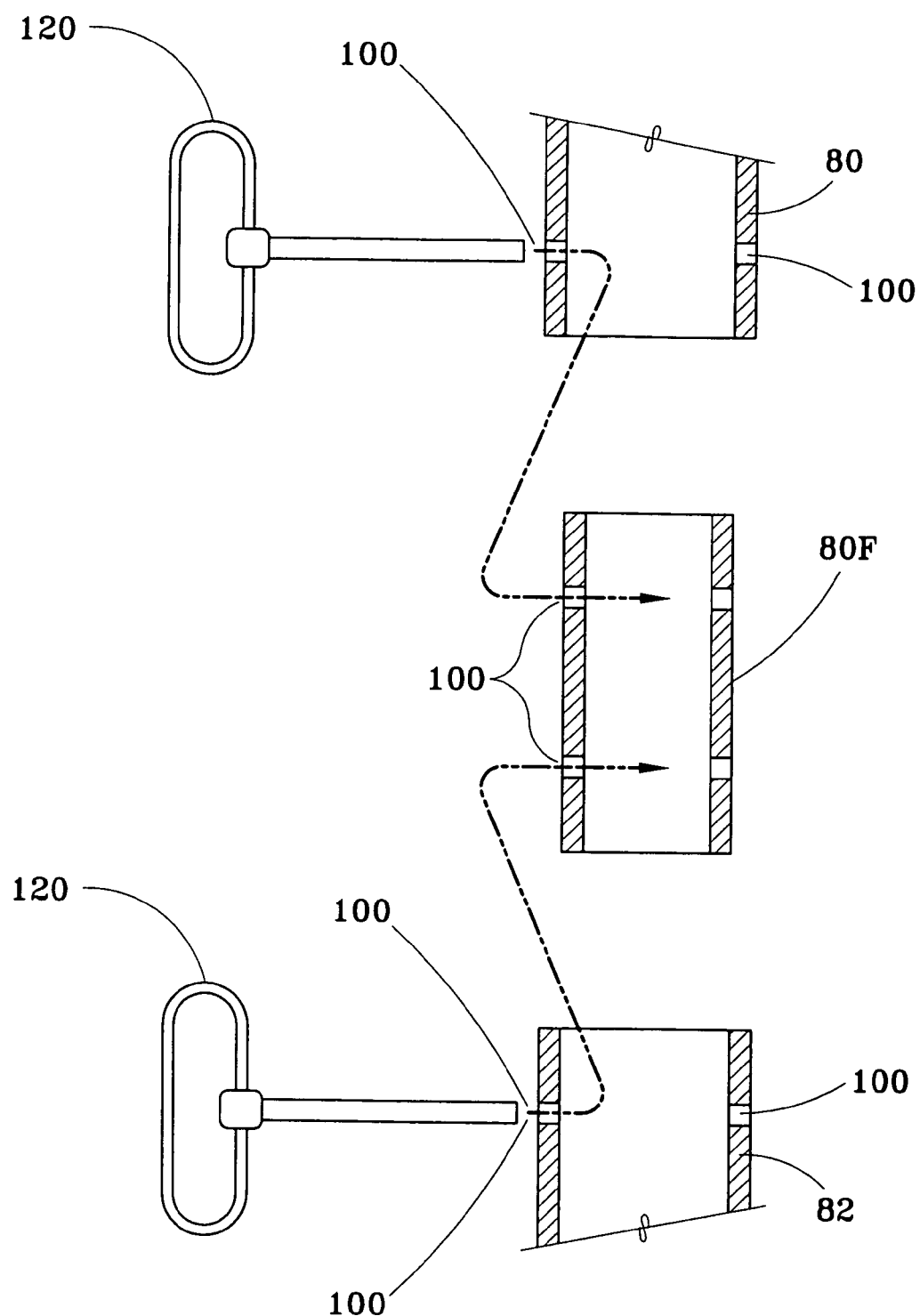
FIG. 3 is an enlarged, cross-sectional, fragmentary view thereof taken along line 3—3 of FIG. 2.

The hoist can be easily assembled and disassembled in the wild. As shown in FIG. 2, in a first embodiment the upright members 20, 22 are each comprised of a reduced diameter, cylindrical fitting 80F that joins a hollow upper tube 80 having an elbow fitting 80E at upper end thereof to a hollow lower tube 82 that includes a T-fitting 82T at a lower end thereof. As shown in FIG. 3, apertures 100 are provided in the fitting 80F, upper tube 80 and lower tube 82 for insertion of hitch pins 120. Similarly, reduced-diameter, cylindrical fittings 90F are inserted into the horizontal, hollow, cylindrical recesses of the T-fittings and serve to join to the T-fitting 82T a pair of oppositely-directed, longitudinally-extended, hollow base tubes 110, thereby forming the bases 16, 18. In the same way, reduced-diameter, cylindrical fittings 24F join by hitch pins 120 the cross beam 24 to the elbow fittings 80E. Suitable apertures are provided to receive the hitch pins 100 for each of these fittings 24F, 80F as depicted, for example for fittings 80F in FIG. 3. To disassemble the frame, it is only necessary to remove the hitch pins 120 and pull apart the various components of the frame. The components parts of the hoist may then be compactly bundled for easy portability.

Figure 4:
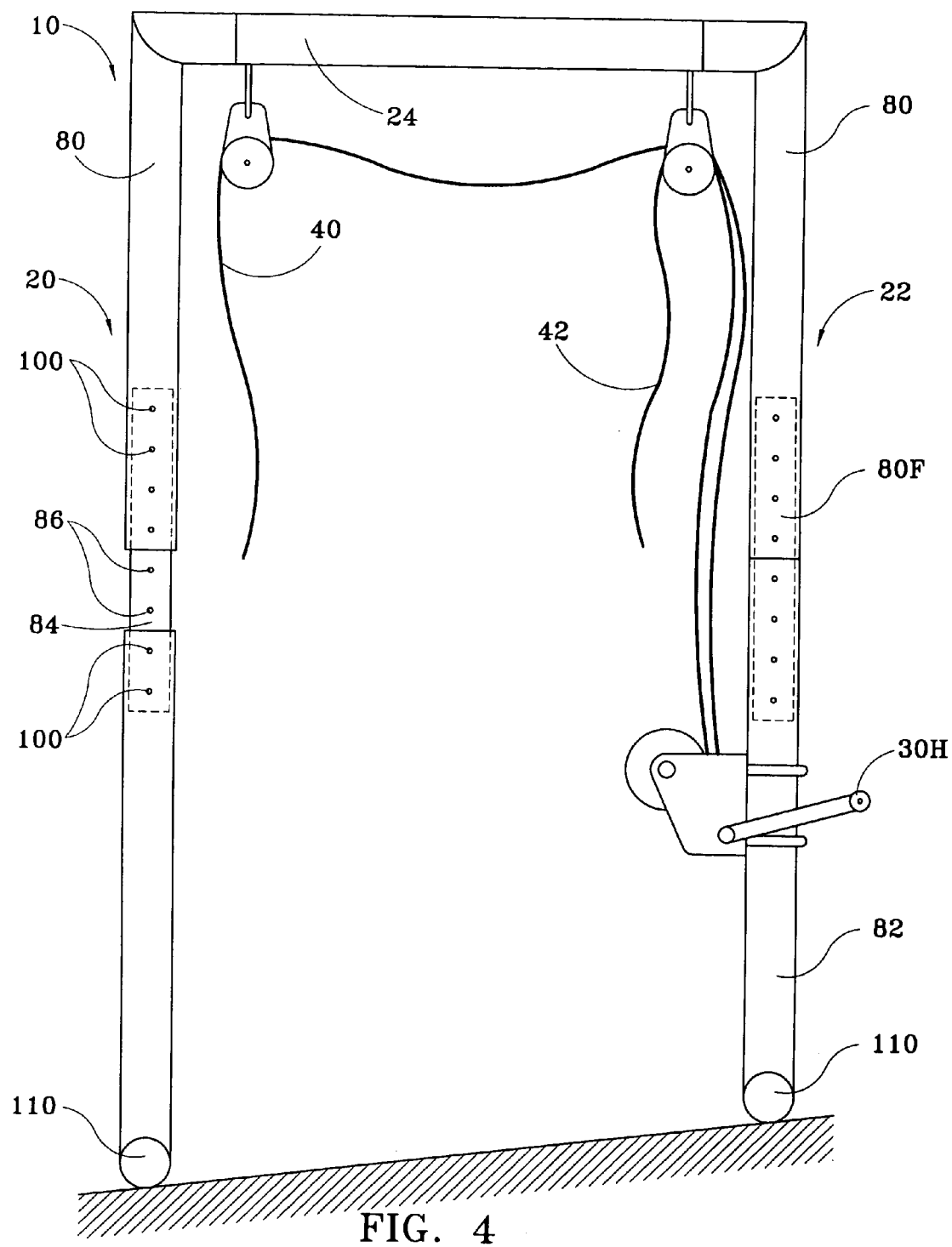
FIG. 4 is front elevational view of a variant thereof having an adjustable, telescoping upright member for accommodating a sloping ground surface.

In order to be able to stably position the hoist 10 on sloping ground, at least one upright member 20 preferably includes additional components that permit adjustment of the length of said member, namely a hollow extension tube 84 that has an upper end inserted within and joined to upper tube 80 and a lower end inserted within and joined to lower tube 82F, as shown in FIG. 4. The extension tube 84 has a plurality of apertures 86 any of which, by telescopic movement of the extension tube 86 with respect to the upper and lower tubes 80, 82, may be selected for alignment with apertures 100 in the upper tube 80 and apertures 100 in the lower tube 82 and secured in place with hitch pins 120 inserted through said selected apertures 86, 100.

Figure 5:
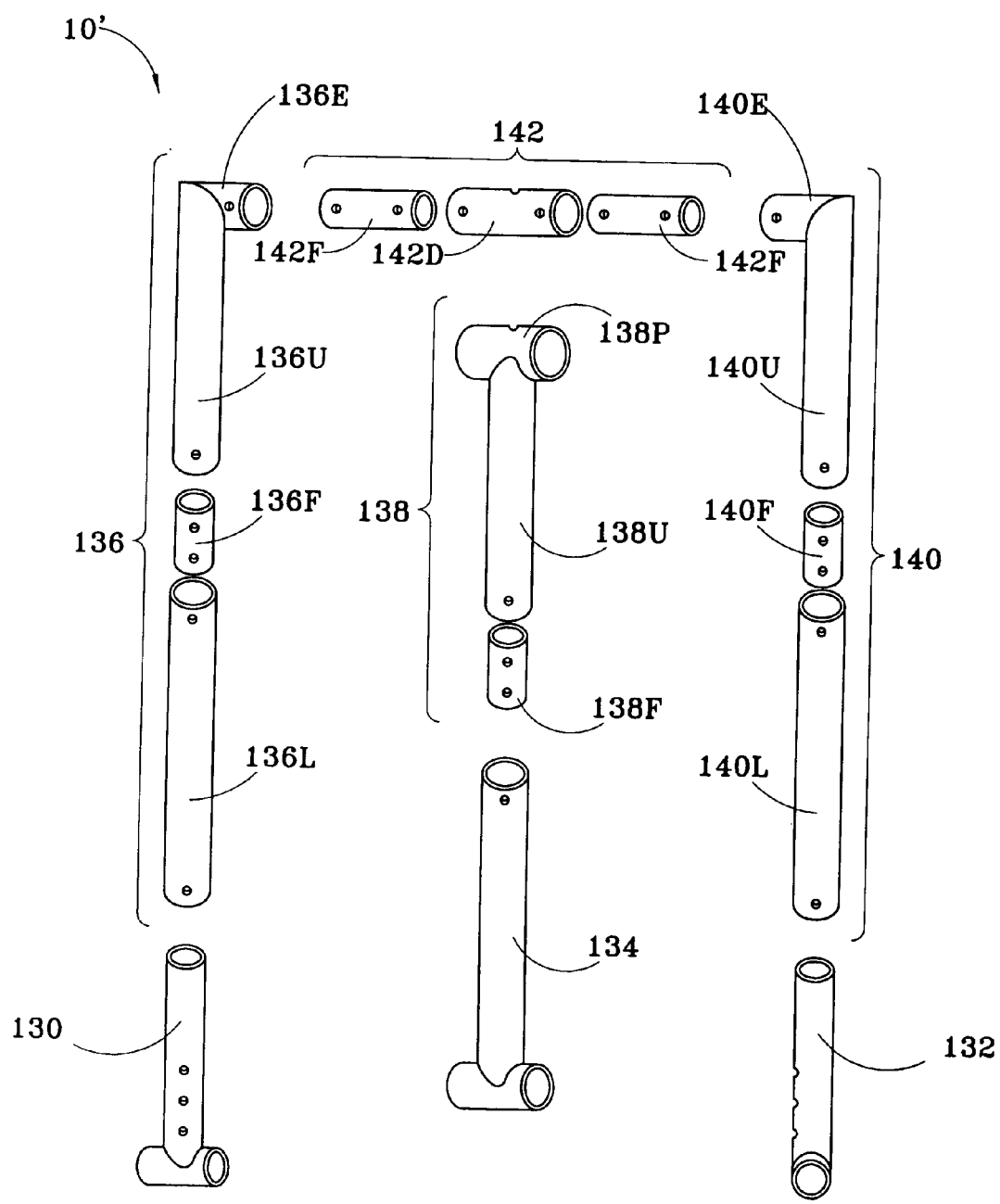
FIG. 5 shows the disassembled frame of a second, alternative embodiment of the invention in perspective view laid out on a ground surface, ready for assembly.

In a second embodiment, the frame for the hoist 10', as depicted unassembled in FIG. 5, comprises a first base 130, a second base 132, and a third base 134 disposed intermediate the first and second bases 130, 132; a first upright member 136 that extends upward from the first base 130; a second upright member 140 that extends upward from the second base 132; a third upright member 138 that extends upward from the third base 134; and a cross beam 142 that is adapted to bridge the upper ends of the upright members and is pivotally attached to said upper ends. The first upright member 136 includes a hollow lower extension tube 136L and a hollow, cylindrical upper tube 136U joined by a reduced-diameter cylindrical fitting 136F; similarly, the second upright member 140 includes a cylindrical lower extension tube 140L and a cylindrical upper tube 140U joined by a reduced-diameter cylindrical fitting 140F. The third upright member 138 includes an upper cylindrical tube 138U and a reduced-diameter fitting 138F for insertion into a lower end thereof and for joining said upper tube 138U to an upper end of the third base 134. The cross beam 142 includes a laterally disposed cylindrical tube 142P and a pair of reduced-diameter fittings 142F on opposite ends thereof. The upper tubes 136U and 140U each include an elbow fitting 136E, 140E for receiving a fitting 142F and for pivotally joining the tube 142P to the first and second upright members 136, 140. An upper end of the upper tube 138U includes a hollow cylindrical protuberance 138P through which the cross beam tube 142P inserts. Accordingly, the fittings 142F provide bearing surfaces for rotation of the first and second upright members 136, 140 about the cross beam 142, and the cross beam tube 142P provides a bearing surface for rotation of the third upright member 138 about the cross beam 142.

Figure 6:
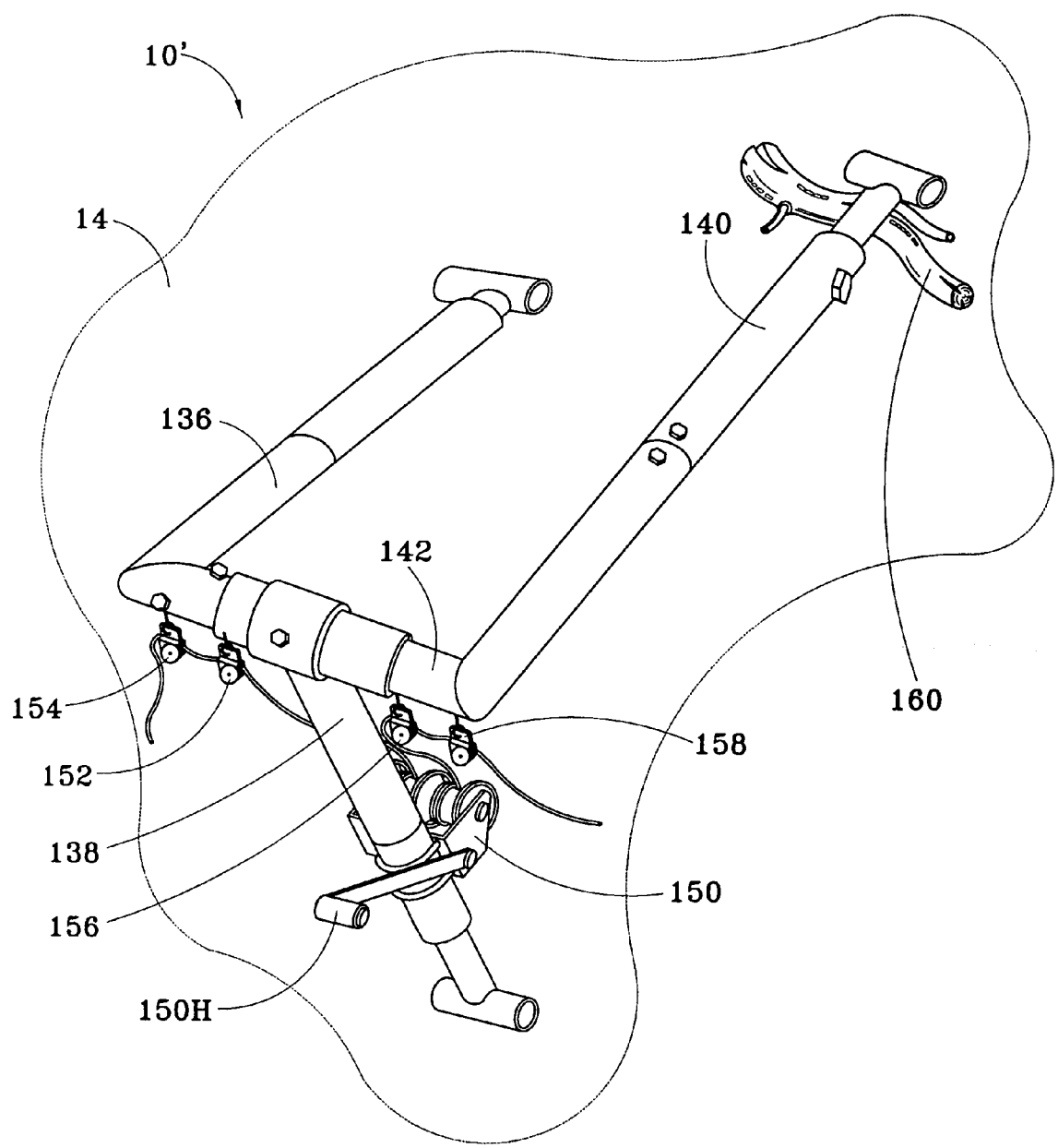
FIG. 6 depicts the second, alternative embodiment in assembled tripod configuration, with one upright member extended over some debris on the ground surface.
Figure 7:
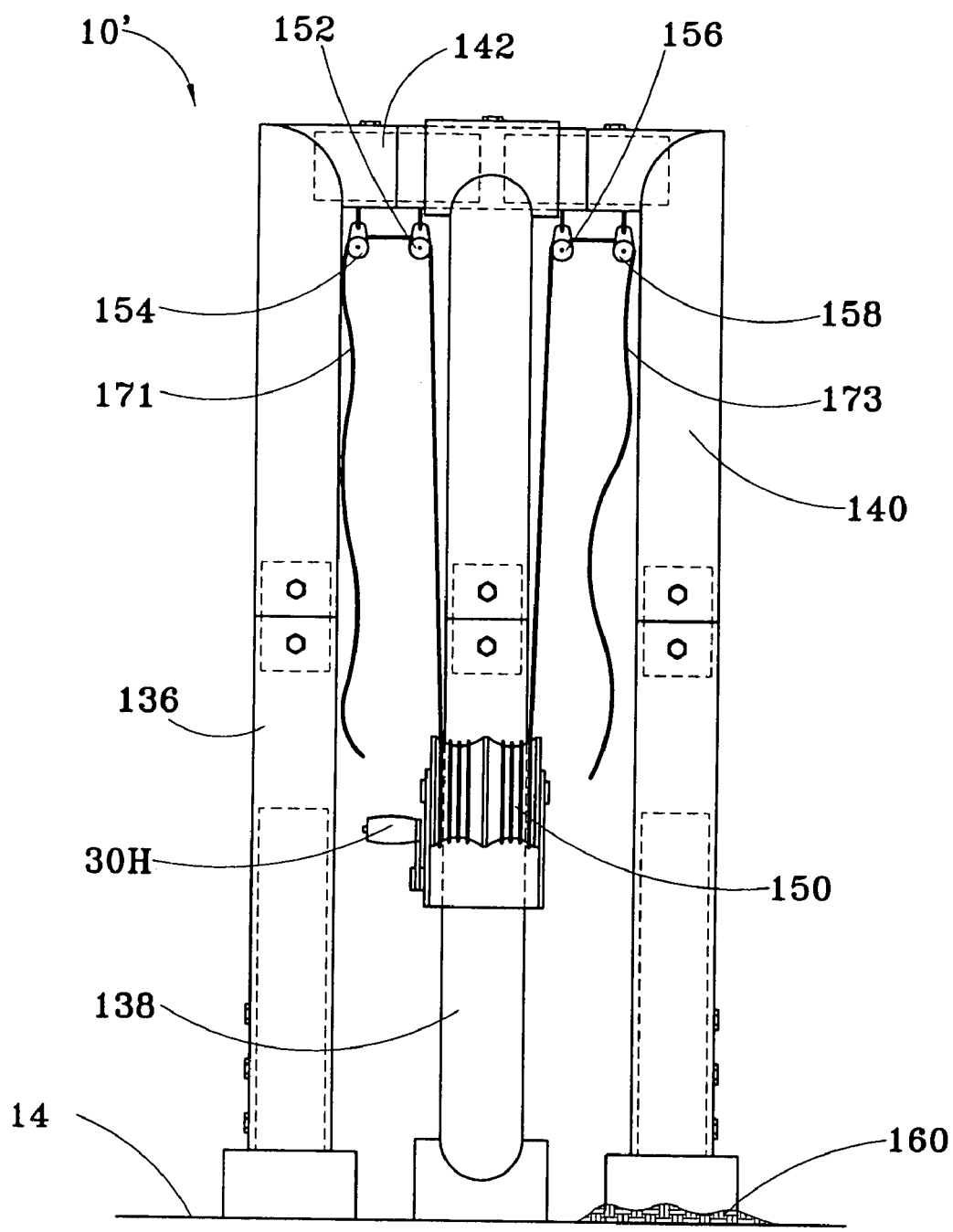
FIG. 7 is an elevational view thereof as viewed by an observer situated on the left side of FIG. 6.
Figure 8:
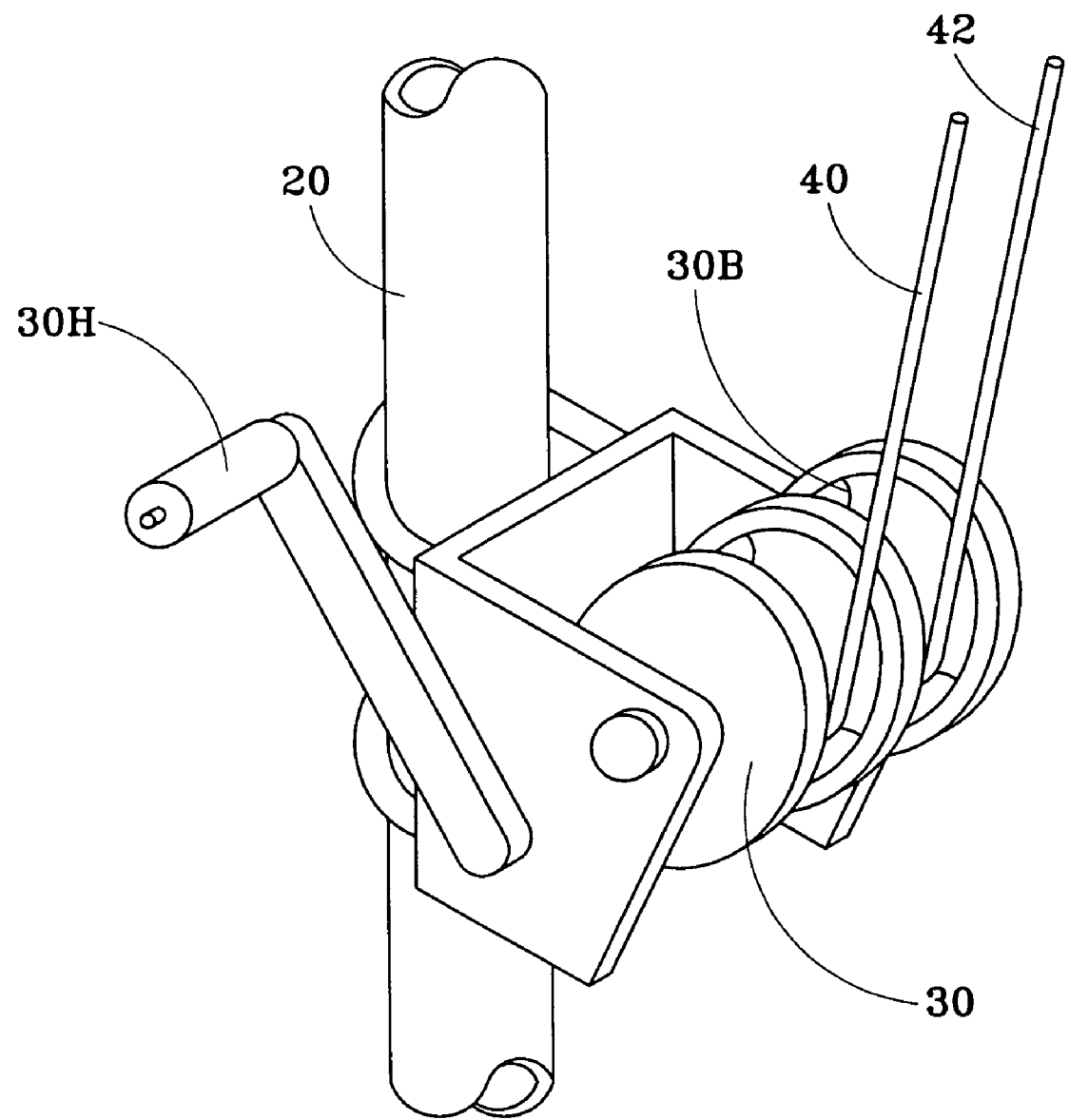
FIG. 8 is an enlarged, perspective view of the winch.

FIGS. 6 and 7 show the second embodiment 10' of the invention fully assembled. The first and second upright members 136, 140 have been partially rotated outward in a first direction and the third upright member 138 has been partially rotated outward in an opposite direction, and their bases placed in contact with the ground surface 14, whereby the frame of the hoist 10' is in a tripod configuration. A winch 150 is preferably mounted on the third upright member 138, and is equipped with a barrel sufficiently wide to accommodate two cables in side-by-side relation and a handle 150H for rotating said barrel. A first pulley block 152 is attached to and depends from the cross beam 142 proximal to an upper end of the third upright member 138, and said first block includes a first pulley. A second pulley block 154 is attached to and depends from the cross beam 142 proximal to an upper end of the first upright member 136 and includes a second pulley. A third pulley block 156 is attached to and depends from the cross beam 142 proximal to an upper end of the third upright member 138 and includes a third pulley. A fourth pulley block 158 is attached to and depends from the cross beam 142 proximal to an upper end of the second upright member 140 and includes a fourth pulley. A first cable 156 has a first end portion wound around the barrel of the winch 150 and an intermediate portion that extends through the first pulley and the second pulley and terminates in an opposite, second end portion. A second cable 158 has a first end portion wound around the barrel of the winch 150 and an intermediate portion that extends through the third and fourth pulleys and thence terminates in an opposite, second end portion. The second upright member 140 is shown lengthened to avoid contact with the debris 160 on the ground surface 14.

It will be appreciated that various modifications can be made to the exact form of the present invention without departing from the scope thereof. For instance, although various tube and fitting components of the frame of the first embodiment have been described and depicted as cylindrical, they could equally well have square cross sections. The frame components can be formed from any low weight materials having sufficient strength and durability, but plastic and/or aluminum are preferred. It is accordingly intended that the disclosure be taken as illustrative only and not limiting in scope, and that the scope of the invention be defined by the following claims.

I claim:

1. A portable device for hoisting and skinning a four-legged game carcass, comprising:

two spaced-apart bases;

upright members arranged to extend from each base, each upright member having a lower end and an opposite, upper end;

a cross beam adapted to bridge the upper ends of the upright members to form a rigid frame;

a winch mounted on an upright member and equipped with a barrel sufficiently wide to accommodate two cables in side-by-side relation and a handle for rotating said barrel;

a first pulley block attached to and depending from the cross beam proximal to the winch, said first block including a first, dual-sheaved pulley;

a second pulley block attached to and depending from the cross beam distal to the winch, said second block including a second, single-sheaved pulley;

a first cable having a first end portion wound around the barrel of the winch and an intermediate portion that extends through the first pulley wherein it engages a second sheave therein and thence terminates in an opposite, second end portion;

whereby the second end portions of the cables can be secured to the rear legs of the carcass and the carcass can be hoisted by rotation of the handle of the winch, thereby stretching the rear legs apart.

2. The device of claim 1, wherein each upright member includes an upper tube having an elbow fitting at an upper end thereof for attachment to the cross beam, said upper tube being joined to a lower tube that includes a T-fitting at a lower end thereof; and each base member includes a pair of elongated tubes disposed on, and joined to, opposite ends of said T-fitting such that each upright member is maintained substantially perpendicular to the first and second foot members.

3. The device of claim 1, wherein at least one upright member further includes an extension tube intermediate, and inserted within, the upper and lower tubes, thereby permitting lengthening and shortening of said upright member for adjusting the hoist to sloping or uneven ground.

4. The device of claim 1, 2, or 3, further comprising tension means for attaching the front legs of the carcass to the upright members such that each front leg can be stretched toward and secured to the nearest adjacent upright member.

5. A portable device for hoisting and skinning a four-legged game carcass, comprising:

first and second spaced-apart bases;

a third base disposed intermediate the first and second bases;

first, second and third upright members attached to and extending upward from the first, second and third bases, respectively, each upright member having a lower end an opposite upper end;

a cross beam adapted to bridge the upper ends of the upright members, said upright members being pivotally mounted for rotation about said cross beam, to form a frame;

a winch mounted on an upright member and equipped with a barrel sufficiently wide to accommodate two cables in side-by-side relation and a handle for rotating said barrel;

a first pulley block attached to and depending from the cross beam proximal to the upper end of the third upright member, said first block including a first pulley;

a second pulley block attached to and depending from the cross beam proximal to an upper end of the first upright member, said second block including a second pulley;

a third pulley block attached to and depending from the cross beam proximal to an upper end of the third upright member, said third block including a third pulley;

a fourth pulley block attached to and depending from the cross beam proximal to an upper end of the second upright member, said fourth block including a fourth pulley;

a first cable having a first end portion wound around the barrel of the winch and an intermediate portion that extends through the first pulley and second pulley and terminates in an opposite, second end portion;

a second cable having a first end portion wound around the barrel of the winch and an intermediate portion that extends through the third and fourth pulleys and thence terminates in an opposite, second end portion;

whereby the first and second upright members and bases can be rotated about the cross beam in a first direction and the third upright and base can be rotated about the cross beam in a second, opposite direction so that the frame assumes a tripod configuration, and the second end portions of the cables can be hoisted by rotation of the handle of the winch, thereby stretching the rear legs apart.

6. The device of claim 5, wherein the winch is mounted on the third upright member.

7. The device of claim 6, wherein the lengths of the first and second upright members each include a telescoping leg portion.

8. The device of claim 7, wherein the first and second upright members each include a telescoping leg portion.

9. The device of claim 8, wherein each of the upright members includes a hollow, cylindrical portion and the cross beam has mating cylindrical bearing surfaces insertable through said hollow, cylindrical portions.

10. The device of claim 8, further comprising tension means for attaching the front legs of the carcass to the upright members such that each front leg can be stretched toward and secured to the nearest adjacent upright member.

11. A portable device for hoisting and skinning a four-legged game carcass, comprising:

means to form a rigid frame, said frame including at least two upright members and a cross beam attached to upper ends of said upright members;

a winch mounted on an upright member and equipped with a barrel sufficiently wide to accommodate two cables in side-by-side relation and a handle for rotating said barrel;

a first pulley block attached to and depending from the cross beam proximal to the winch, said first block including a first pulley;

a second pulley block attached to and depending from the cross beam distal to the winch, said second block including a second pulley;

a first cable having a first end portion wound around the barrel of the winch, an intermediate portion that extends through the first pulley wherein it engages a first sheave therein and thence extends through the second pulley and terminates in an opposite, second end portion; and a second cable having a first end portion wound around the barrel of the winch and an intermediate portion that extends through the first pulley wherein it engages a second sheave therein and thence terminates in an opposite, second end portion;

whereby the second end portions of the cables can be secured to the rear legs of the carcass and the carcass can be hoisted by rotation of the handle of the winch, thereby stretching the rear legs apart.

* * * * *